United States Patent [19]

Todd

[11] Patent Number: 4,961,553

[45] Date of Patent: Oct. 9, 1990

[54] SUPPORT SYSTEM FOR PIPES AND OTHER LOADS

[76] Inventor: George R. Todd, 18333 NE. 146th, Woodinville, Wash. 98072

[21] Appl. No.: 252,855

[22] Filed: Oct. 3, 1988

[51] Int. Cl.⁵ ............................................. F16L 3/08
[52] U.S. Cl. ........................................ 248/62; 248/72
[58] Field of Search ............... 248/62, 72, 74.1, 297.2, 248/297.3

[56] References Cited

U.S. PATENT DOCUMENTS

| 1,668,953 | 5/1928 | Erickson . | |
| 2,273,571 | 2/1942 | Hafemeister . | |
| 2,569,622 | 10/1951 | Trainor | 248/297.2 X |
| 2,651,489 | 9/1953 | Bell | 248/297.2 X |
| 3,042,352 | 4/1960 | Stamper . | |
| 3,132,831 | 5/1964 | Stamper | 248/74.1 X |
| 3,226,069 | 12/1965 | Clarke | 248/74.5 X |
| 3,527,432 | 9/1970 | Lytle | 248/73 X |
| 3,565,385 | 2/1971 | Zurawski . | |
| 3,650,499 | 3/1972 | Biggane | 248/62 |
| 4,212,445 | 7/1980 | Hagen | 248/297.3 X |
| 4,417,711 | 11/1983 | Madej . | |
| 4,638,966 | 1/1987 | Ford | 248/62 |
| 4,695,019 | 9/1987 | Lindberg et al. | 248/74.3 |
| 4,789,286 | 12/1988 | Laput | 248/297.2 X |

FOREIGN PATENT DOCUMENTS

| 2164991 | 7/1973 | Fed. Rep. of Germany | 248/72 |
| 2617117 | 10/1977 | Fed. Rep. of Germany | 248/62 |

OTHER PUBLICATIONS

1987 Spring Catalog, Aickinstrut, Inc.

Primary Examiner—Ramon O. Ramirez
Assistant Examiner—Robert A. Olson
Attorney, Agent, or Firm—Hughes & Multer

[57] ABSTRACT

Systems for supporting pipes and other loads from elongated struts and channels. Clamps, connectors, and other fittings for attaching the supported load to the channel fit into cooperating notches formed in flanges spaced inwardly from the side walls of the channel. This interfitting relationship provides a positive connection between the fitting and the channel, keeping even heavy loads and loads subjected to vibration, hammering, or the like and supported from the channel slipping, even if the supporting channel is vertically oriented and the load is therefore the most susceptible to slippage.

10 Claims, 3 Drawing Sheets

SUPPORT SYSTEM FOR PIPES AND OTHER LOADS

TECHNICAL FIELD OF THE INVENTION

The present invention relates to support systems and, more particularly, to novel, improved systems for supporting pipes and other loads from elongated, horizontally and vertically oriented struts or channels.

BACKGROUND OF THE INVENTION

A number of systems for supporting pipes and other components from elongated, U-section components variously termed struts and channels have heretofore been proposed. Systems of the foregoing character of which I am aware are disclosed in U.S. Pat Nos.: 1,668,953 issued May 8, 1928, to Erickson for MOLDING FOR ELECTRIC CABLES; 2,273,571 issued Feb. 17, 1942, to Hafemeister for PIPE HANGER; 3,042,352 issued Jul. 3, 1962, to Stamper for PIPE HANGER; 3,132,831 issued May 12, 1964, to Stamper for CLIP-ON PIPE HANGER; 3,226,069 issued Dec. 28, 1965, to Clarke for HANGER FOR CYLINDRICAL CONDUITS AND THE LIKE; 3,527,432 issued Sept. 8, 1970, to Lytle for PIPE OR TUBING SUPPORT; 3,565,385 issued Feb. 23, 1971, to Zurawski for FLUORESCENT TUBE BOX SUSPENSION SYSTEM AND MEANS; 3,650,499 issued Mar. 21, 1972, to Biggane for CLAMP FOR PIPE SUPPORT WITH SLANTING PIVOTAL ASSEMBLY; 4,417,711 issued Nov. 29, 1983, to Madej for PIPE HANGER; and 4,695,091 issued Sept. 22, 1987, to Lindberg et al. for NON-METALLIC STRUT SYSTEM and in a Spring 1987 catalog from Aickinstrut, Inc., P. O. Box 569, Redmond, Wash. 98073.

Systems of the type disclosed in the foregoing patents have been in use for over fifty years to support pipes, electrical raceways, and other system components from the floors, walls, and ceilings of buildings and from other structures. The struts or channels of the system are attached to the structure; and clamps, connectors, and other fittings are employed to attach the supported component (or load) to the channels or struts.

The earlier systems of this type were fabricated from such then available materials as cold rolled steel (see, for example, above-cited U.S. Pat. Nos. 1,668,953 and 2,273,571), and a number of systems of comparable character have been proposed in more recent years (see above-cited U.S. Pat Nos. 3,042,352; 3,132,831; 3,226,069; 3,565,385; 3,650,499; and 4,417,711). These heretofore proposed systems have the decided disadvantage that they offer little resistance to corrosion unless painted or galvanized. Even then, they deteriorate rapidly in aggressive chemical environments, for example in pulp mills and in buildings housing plating tanks. Therefore, as engineering polymers became available, a number of manufacturers substituted those materials for the theretofore employed steels and other metals. To date, this has met with only limited success. This is primarily because the designers of non-metallic support systems have not taken into account the physical differences between the non-metallic and metallic materials they employed. Of particular significance in this respect are the typically quite different coefficients of friction of the metallic and non-metallic materials employed in systems of the type under discussion.

Specifically, in a typical, heretofore proposed system with metal components, there is a simple frictional fit between the supporting strut or channel and the fixture installed in that channel to support a load from it (see, for example, above-cited U.S. Pat. Nos. 3,226,069; 3,527,432; 3,565,385; 3,650,499; and 4,417,711). With non-metallic, engineering polymers substituted for the theretofore utilized metallic components (see, as an example, above-cited U.S. Pat. No. 4,695,019) this approach proves somewhat less than satisfactory. Due to the much lower coefficients of friction, the load-supporting fixture can easily slip along the supporting strut or channel when a polymer is substituted for metal in a conventional support system design, allowing the load to shift. This is especially true in applications in which the supporting channels are vertically oriented, particularly if the load is relatively heavy or subjected to vibration or hammering and because the pipe runs are often then employed as ladder rungs. Shifting loads are of course very undesirable as they radically increase the potential for system failure.

The use of stop blocks in the load-supporting channel or a complicated channel and fixture arrangement with extended continuous contact therebetween (see above-cited U.S. Pat. No. 4,695,019) to increase the fixture-to-channel contact area and therefore increase the friction between these system components and minimize slippage of the supported load has heretofore been proposed. This approach is, however, not without its disadvantages. Perhaps the most important of these is that the average installer must be reeducated and his resistance to employing a non-conventional system with an additional component overcome. Secondly, available stop blocks are relatively expensive; and large numbers of these components (typically four per foot) are required. Therefore, in a typical installation, systems employing stop blocks are not competitive unless corrosion problems are severe and support systems with metallic components can not be employed. Finally, and as a corollary, systems with stop blocks are typically not competitive because of the additional labor required to install a system of that character.

Another approach to preventing slippage that is suggested in the prior art is to notch the side walls of the U-sectioned supporting channel and to install the load connecting system components in these notches so that the fitting cannot slip relative to the channel, even if the latter is vertically oriented. The above-cited Stamper U.S. Pat. Nos. 3,042,352 and 3,132,831 disclose systems of the just-described character. Again, however, the heretofore proposed system is not one which would be satisfactory if channels fabricated of engineering polymers rather than metal components were employed to get the corrosion resistance and other benefits of those non-metallic materials. Specifically, the slots or notches in the Stamper channels leave lips or ears of very small section on which the supported load is imposed. In applications involving heavy loads or vibration, these lips would be very apt to fail, resulting in system failure. If an engineering polymer with its lower shear strength were substituted for steel in Stamper's systems, this tendency would be many times aggravated and the substitution would produce a system of little if any value.

Furthermore, failure of one load will often have a domino effect with adjacent loads failing until the entire system or a large section of it has been destroyed. Thus, the heretofore proposed support systems have the important drawback that they are unable to prevent such catastrophic failures.

Another salient disadvantage of the Stamper systems is that it would be extremely difficult, if possible at all, to connect cross channels between parallel horizontal or vertical runs. Ths side walls of the Stamper systems are so thin, in this respect, that it would not be practical to support a cross-channel of the Stamper type from the side walls of a normally extending channel as would be required to connect those channels together. Thus, as a grid of supporting channels is typically required, the applications in which the Stamper systems would be useful are extremely limited.

Still Another disadvantage of the Stamper systems is that no provision is made for retaining a channel nut or other fixture component in the load-supporting strut. This is a significant drawback as channel nuts and the like can be employed to advantage in attaching connectors and other fittings via which one channel may be connected to a cross channel and also via which a variety of different load devices may be attached to a channel. Modifications of the Stamper channels which would allow the use of channel nuts and the like would be impractical because the channel configurations required to retain such devices would increase the cost of the channels to the point where the system would become economically non-competitive if they were rendered in metal.

SUMMARY OF THE INVENTION

The have now been invented, and disclosed herein, certain new and novel support systems which are free of the disadvantages of, and otherwise superior to, the prior art systems of that character discussed above.

These novel, improved support systems, generally speaking, include elongated struts or channels and clamps, connectors, and other fittings for attaching a load to the supporting channel. The system components may be fabricated of non-metallic materials. This makes the novel systems disclosed herein appropriate for even highly corrosive environments. At the same time, the system components are simple and relatively inexpensive to manufacture; and the resulting systems are accordingly sufficiently inexpensive to be employed in even the most mundane of applications.

Perhaps most prominent among the novel features of the systems disclosed herein is the type of supporting channel which is employed. Like conventional channels, those employed in the present invention have a U-shaped cross-section; and, like those disclosed in Stamper U.S. Pat. Nos. 3,042,352 and 3,132,831, the channels of the present invention have notches in which the load-supporting fittings can be engaged to keep the load from shifting, even in demanding applications in which the channels are vertically oriented and the loads are heavy or of a nature which causes hammering or vibration. In contrast to the Stamper channels, however, these notches are not formed in the side walls of the channel. Instead, they are molded or otherwise formed in the rearmost, free or exposed edges of cooperating flanges which are integral with, and spaced inwardly from, the side walls of the channels.

One consequence of this novel construction is that the load-supporting capacity of the channel is dramatically increased over that available in a Stamper-type channel even though the materials may have less shear strength because much thicker sections are practical. A second, also significant, advantage of the herein disclosed channels is that channel nuts and other trapped-type fittings can be employed, greatly increasing the versatility of the channel by increasing the types of fittings which may be employed with it. At the same time, and because they are fabricated from non-metallic materials, the channels of the present invention can be supplied at competitive costs whereas they could not be, if fabricated for metal as Stamper's are.

OBJECTS OF THE INVENTION

From the foregoing, it will be apparent to the reader that one important and primary object of the present invention resides in the provision of novel, improved systems for supporting pipes and other loads.

Related and also important but more specific objects of the invention reside in the provision of support systems as defined in the preceding object which employ elongated, load-supporting struts which can be fabricated of non-metallic components and are therefore useful in highly corrosive environments as well as in applications with less demanding requirements;

which, in conjunction with the preceding objects, employ elongated, load-supporting channels or struts and are so designed and constructed that slippage of the load relative to the channel is prevented, even when the channel is vertically oriented and the load is heavy and/or subject to vibration or hammering or other slippage promoting influences;

which employ load-supporting channels so configured as to allow use of channel nuts and other devices employed in conventional support systems to attach pipes and other loads to the struts of those systems;

which employ load-supporting channels so configured that two cross or other channels can be easily and securely fixed to each other;

which are economically competitive with available metallic and non-metallic support systems;

which do not require that the installer be trained or educated in the installation of the system;

which are versatile in that a variety of loads of different character can be supported from the same channel(s) of the system.

Other important objects and features and additional advantages of the invention will be apparent to the reader from the appended claims and as the ensuing detailed description and discussion proceeds in conjunction with the accompanying drawing.

DETAILED DESCRIPTION OF THE INVENTION

Figures 1, 2, 3:
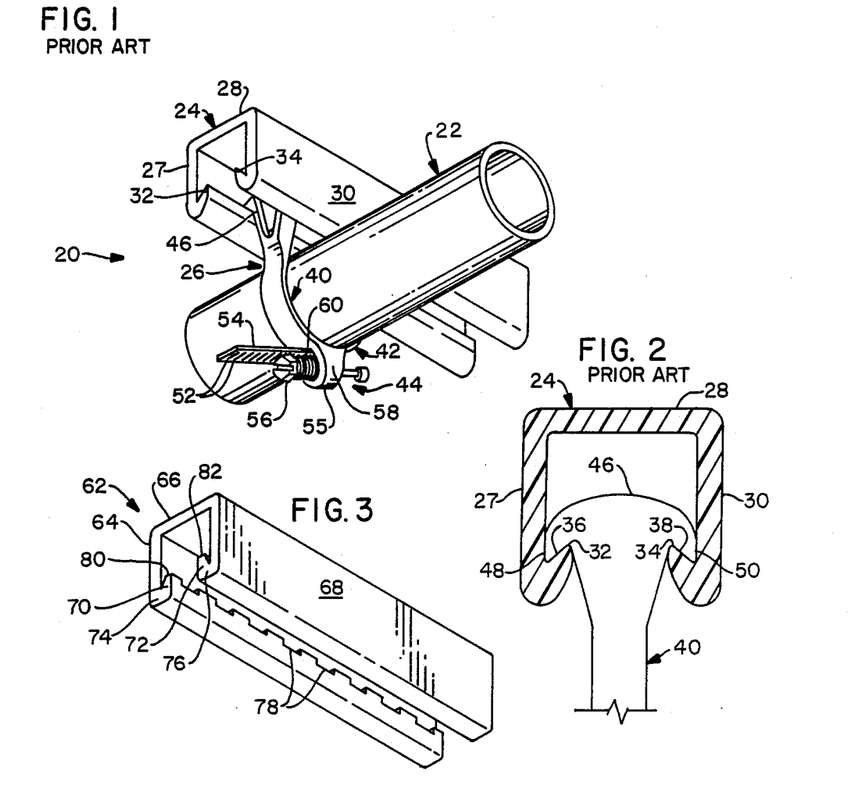
FIG. 1 is a pictorial view of the prior art pipe support system.
FIG. 2 is a partial section through the prior art pipe support system shown in FIG. 1.
FIG. 3 is a pictorial view of an elongated channel embodying the principles of the present invention and usable with fittings of the character shown in FIGS. 1 and 2 to keep a pipe from slipping relative to the channel when it is supported therefrom.

Referring now to the drawing, FIGS. 1 and 2 depict a heretofore proposed system 20 for supporting a pipe 22 from an associated framework or structure (not shown). The major components of this prior art, pipe-supporting system 20 are an elongated strut or channel 24, which is fixed to the structure, and a clamp 26 for attaching the pipe to channel 24. Channel 24 has integral side and back walls 27, 28, and 30. Flanges 32 and 34, which are integral with channel side walls 27 and 30 at the forward, or free, edges of those channels, define clamp-receiving recesses 36 and 38.

Clamp 26 is made up of two, straplike, pipe-engaging components 40 and 42 and a fastener assembly 44 for clamping pipe 22 between components 40 and 42 and against channel 24 as shown in FIG. 1.

Each of these clamp components 40 and 42 has an integral, mushroom shaped head 46 at the inner, or channel-associated, end thereof. Integral flanges 48 and 50 at opposite sides of head 46 fit into the recesses 36 and 38 of channel 24 with continuous contact between: (1) head 46 and channel flanges 32 and 34, and (2) head 46 and side walls 27 and 30 of channel 24. This frictionally fixes clamp 26 to channel 24 with pipe 22 confined between the two clamp components 40 and 42 and thereby supported from channel 24.

The assembly 44 employed to fasten the two members 40 and 42 of clamp 26 together with pipe 22 therebetweem is shown in FIG. 1. It includes a series of parallel, equidistantly spaced apart, transversely extending slots 52 in the outer, or free end, section 54 of clamp component 42. This section 54 of component 42 slidably extends through the associated clamp component 40 adjacent the outer, or free, end 55 of that component.

Cooperating with slots 52 to fasten clamp components 40 and 42 together is a screw 56 housed for rotation in the outer, end section 58 of pipe clamp component 40 and constrained against axial movement in that component. The threads 60 on this screw engage the slots 52 in pipe clamp component 42. Therefore, by rotating screw 56 in clamp component 42, the straplike end section 54 of component 42 can be displaced through the cooperating component 40 of clamp 26. This draws the two components 40 and 42 of the clamp together to fix pipe 22 therebetween and against the flanges 32 and 34 of the associated strut 24 as shown in FIG. 1.

Because pipe support system 20 is conventional and because the details of that system as described above are not part of the present invention, pipe-supporting system 20 will not be described in further detail herein. Additional details of the system in question may, however, be found in the above-cited Lindberg et al. patent to which the reader may refer, if desired.

As was discussed briefly above and as will be apparent to the reader from FIGS. 1 and 2, systems of the type shown in those figures depend upon friction between strut 24 and the components of pipe clamp 26 to keep the latter—and, accordingly, pipe 22—from shifting or slipping relative to the supporting strut. Friction alone is often inadequate to prevent this unwanted movement of pipe 22 relative to the supporting strut, especially in applications where the strut is vertically oriented with the pipe run horizontal and gravity therefore acts to shift the pipe clamp and pipe downwardly relative to the supporting strut. This unwanted, and potentially disastrous, shifting of pipe 22 is prevented in an elegant, yet simple and inexpensive fashion, in accord with the principles of the present invention by replacing the supporting strut or channel 24 of conventional construction and illustrated in FIG. 1 with the novel, also channellike strut 62 shown in FIG. 3.

Like strut 24, strut 62 has a U-shaped configuraton; and it has integral side and back walls 64, 66, and 68. Spaced inwardly from channel side walls 64 and 68 are integral flanges 70 and 72. These extend from the forward edges of channel side walls 64 and 68 toward the rear wall 66 of the channel. Flanges 70 and 72 are spaced from and parallel to the side walls 64 and 68 of the channel and connected to the adjacent side walls by integral, transversely extending channel portions 74 and 76.

Rectangular notches 78 of uniform shape and size are formed in, and spaced equidistantly along, the inner flanges 70 and 72 of channel 62. These recesses 78 open onto the rear, free edges 80 and 82 of channel flanges 70 and 72.

In one typical application of the present invention, channel 62 is fabricated from fiberglass or a glass filled polypropylene or polyvinylchloride. Side and back walls 64, 66 and 68 are approximately 0.125" thick. The channel is typically 1.625" wide and 1.0625" deep, and flanges 70 and 72 are approximately 0.312" thick. In this exemplary channel, notches 78 are 0.218" deep and 0.625" long and are spaced 0.625" apart along flanges 70 and 72 with the notches in the two flanges paired and located opposite each other.

It will be appreciated from the foregoing and FIG. 3 that the flanges 70 and 72 of channel can easily and inexpensively be made thick enough to withstand expected, high shear (as well as tension and compression) loads.

Clamps of the same general character as those discussed above and identified by reference character 26 may be employed with channel 62 to support a pipe therefrom. One of the two cooperating components of a clamp particularly designed for use with channel 62 is shown in fragmentary form in FIGS. 4 and 5 and identified by reference character 84.

Pipe clamp component 84 and the second clamp component associated therewith are configured to clamp a pipe therebetween and against the integral, transversely extending sections 74 and 76 at the forward end of channel 62 in a manner akin to that shown in FIG. 1 by drawing the two clamp components together with a fastening arrangement such as that discussed above and identified by reference character 44 in FIG. 1.

Figure 4:
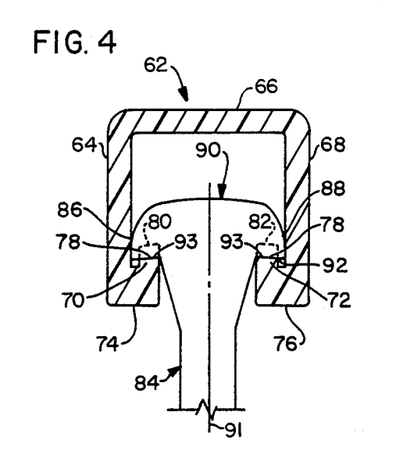
FIGS. 4 and 5 are views of a pipe support system similar to FIG. 2 but employing a load-supporting channel of the type shown in FIG. 3 in accord with the principles of the present invention.
Figure 5:
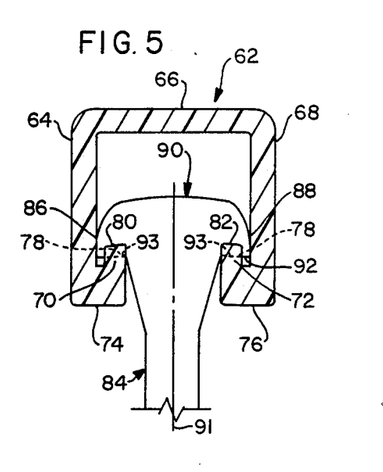

In the completed strut-clamp-pipe assembly, integral flanges 86 and 88 are provided at the opposite sides of the channel spanning head 90 of each clamp component. These flanges extend laterally relative to the longitudinal centerline 91 of the member. They are seated in a transversely aligned pair of notches 78 in the two, integral, inner flanges 70 and 72 of channel 62. This provides an interfitting relationship between the components of the clamp and the associated strut or channel 62 and a positive connection therebetween. Also, the pipe held against channel 62 by the clamp keeps the heads 90 of the clamp components from leaving the notches 78 in channel flanges 70 and 72.

The result of the novel arrangement just described is that the clamp components and the pipe therebetween cannot slip relative to channel 62, even if the channel is vertically oriented and the weight of the pipe and/or any fluids flowing therethrough and/or forces such as vibration or hammering are contributing to the tendency of the clamp to slip downwardly with respect to channel 62. Thus, in even these most demanding applications, novel support system disclosed herein positively prevents slippage of a support pipe relative to a supporting channel by providing a positive, interfitting engagement between the channel and the system components by which the supported pipe is attached to that channel.

Yet another important advantage of the present invention is that the important benefit discussed above—lack of slippage—can be obtained in support systems employing load-attaching fittings which differ considerably from the clamp 26 depicted in FIGS. 3-5 and discussed above. Furthermore, this benefit can be obtained without dimensional or other modification of the channel or strut-type support illustrated in FIG. 3. This is important in that it simplifies and significantly reduces the cost of providing a channel or strut system in those applications where more than one type of fitting is needed—for example, to support loads from the struts and to connect the struts together.

The members of the clamp illustrated in FIGS. 4 and 5 may differ to some extent from those of the prior art clamp 26 illustrated in FIG. 1. For example, the continuous clamp member-to-channel contact required in the prior art system of FIG. 1 is unnecessary in systems employing the principles of the present invention as is evident from FIGS. 4 and 5. Elimination of this continuous contact may in fact be desirable by making it easier to displace the clamp members along the channel to the location where they are wanted.

Also, the lower edge 92 of each clamp component head 90 is oriented at right angles to the longitudinal centerline 91 of the component rather than being inclined thereto at an acute angle as in the prior art system. This results in efficient seating of the heads 90 in and against the inner ends 93 of the notches 78 is the flanges 70 and 72 of load-supporting channel 62.

Figure 6:
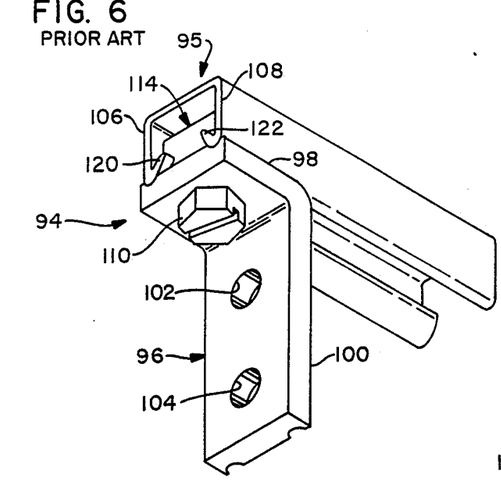
FIG. 6 is a view similar to FIG. 1 of a prior art system which uses an L-shaped connector to support components from an elongated strut or channel.
Figure 7:
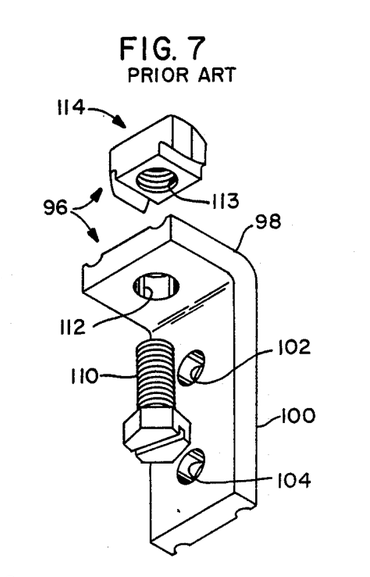
FIG. 7 is an exploded view of the connector employed in the system of FIG. 6.
Figure 8:
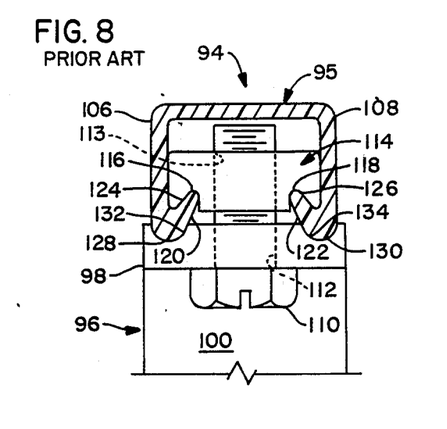
FIG. 8 is a partial section through the support system of FIG. 6.

It was pointed out above that the novel channels or struts disclosed herein have the important advantage of being able to accept a wide variety of fittings without modifying the channel. In this regard, FIGS. 6-8 depict a heretofore available support system 94 in which a supported component or load such as the end of another channel (not shown) is attached to a U-sectioned channel or strut 95 by a L-shaped connector 96. A system of this type may, for example, employ two connectors of the type identified by reference character 96 disposed in back-to-back relationship to couple a cross strut or channel to strut 95.

The strut or channel 95 of support system 94 is identical to the prior art strut 24 discussed above, and connector 96 has two integral legs 98 and 100 disposed at right angles to each other. Apertures 102 and 104 through leg 100 accommodate fasteners (not shown). Those are employed to attach the supported component to connector 96.

The second, integral leg 98 of connector 96 is fixed to the side walls 106 and 108 of channel 95 by a fastener 110. This fastener extends through an aperture 112 in connector leg 98 and is threaded into the internally threaded aperture 113 of a rectangular channel nut 114. This nut is trapped in channel 95 between the side walls 106 and 108 of the channel and against the rear ends 116 and 118 of channel flanges 120 and 122 with grooves 124 and 126 in the nut accommodating flanges 120 and 122. Tightening fastener 110 by rotating it relative to nut 114 therefore clamps the leg 98 of connector 96 against the free or forward edges 128 and 130 of channel side walls 106 and 108 which are seated in grooves 132 and 134 in connector leg 98 to keep connector 96 from rotating relative to the channel. This frictionally secures the connector 96 to channel 95.

Like the prior art system 20 discussed above and illustrated in FIGS. 1 and 2, that system 94 shown in FIGS. 6-8 has the disadvantage that the connector 96 can slip relative to the channel 95 to which it is attached, especially if the channel is oriented vertically. As in system 20, there is only a frictional connection between channel 95 and the fitting (in this case connector 96) attached to that channel.

Figure 10:
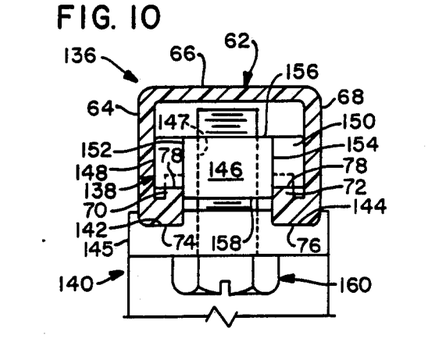
FIGS. 10 and 11 are partial sections through a support system of the character alluded to in the foregoing brief description of FIG. 9.
Figure 11:
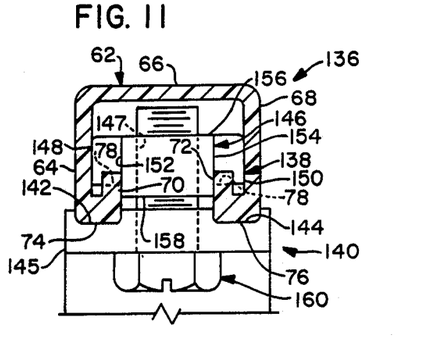

This problem of slippage is eliminated in the system 136 employing the principles of the present invention and illustrated in FIGS. 10 and 11. This system uses an L-shaped connector 140 of the type illustrated in FIGS. 6 and 7, and the channel nut 138 of connector 140 is fitted into and trapped in the flange-associated notches 78 of the connector-supporting strut or channel 62 of system 136. Therefore, the connector 140—and consequently the components attached to that connector—cannot slip or shift along channel 62 even in the worst case in which the channel is vertically oriented; a heavy load is supported from it; and hammering, vibrational, or other forces are imposed on the load.

As indicated above, another important benefit of the novel support system 136 depicted in FIGS. 10 and 11 is that it may employ the same channel 62 as the pipe-supporting system depicted in FIGS. 4 and 5. This is particularly important in mixed systems, such as that suggested above, in which the same strut or channel 62 may be employed to support a pipe attached by a clamp as shown in FIGS. 4 and 5 and may have cross struts or channels attached to it by a connector 140.

The L-shaped connector 140 of support system 136 is virtually identical to the above-discussed connector 96 of system 94. However, it does differ from the latter primarily in that the grooves 142 and 144 in channel abutting connector leg 145 are configured to accept the wider, integral, transversely extending sections 74 and 76 at the forward or free ends of channel side walls 64 and 68.

Figure 9:
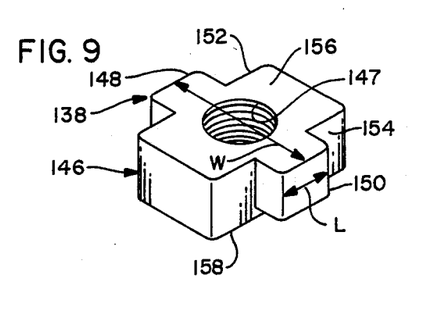
FIG. 9 is a pictorial view of a nut or locking device employed in the connector of a support system similar to that illustrated in FIG. 6 but employing the principles of the present invention.

As is evident from FIGS. 9-11 and especially FIG. 9, a somewhat differently shaped channel nut 138 is preferably employed in those support systems embodying the principles of the present invention which, like system 136, employ a channel-type strut and a trapped nut to attach a fitting to that strut. In particular, nut 138 has a cruciform configuration; a body 146 with an internally threaded aperture 147 for fastener 110; and integral, facing lugs 148 and 150 of identical configuration extending outwardly from opposite sides 152 and 154 of the body 146 of the nut. These lugs extend downwardly from the upper surface 156 of the nut to a level above the bottom edge 158 of that component. The two lugs 148 and 150 of the nut 138 have a length 1 which is slightly less than the corresponding longitudinal dimensions of the recesses or notches 78 in the flanges 70 and 72 of channel 62. This allows the lugs 148 and 150 of nut 138 to be easily but positively seated in notches 78 when connector 140 is assembled to channel 62 (see FIGS. 10 and 11).

Nuts 138 have a transverse dimension w which is slightly less than the span between the two side walls 64 and 68 of channel 62. This allows the nut to be slid through channel 62 to the desired location of connector 140 therealong without binding, yet keeps the nut from rotating in the channel and allowing fastener 160 to come loose.

The cruciformlike nut 138 just described and illustrated in FIG. 9 has the advantage that it allows system 136 to be designed for heavy shear loads. At the same time, the above-discussed configuration and dimensions of lugs 148 and 150 allow identical channels (or the same channel) to accept both connectors of the character shown in FIGS. 10 and 11 and pipe-supporting clamps of the type shown in FIGS. 4 and 5.

Figure 12:
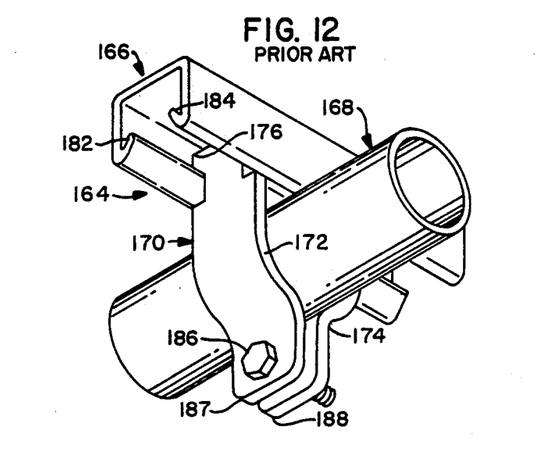
FIG. 12 is a view similar to FIG. 1 of a second type of heretofore proposed pipe support system.
Figure 13:
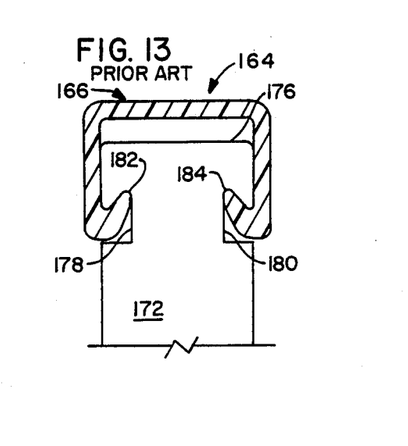
FIG. 13 is a partial section through the pipe support system of FIG. 12.

A further appreciation of the versatility and benefits of the present invention may be gained from first considering the commonly employed system 164 for supporting pipe from a designated structure or framework that is shown in FIGS. 12 and 13. System 164 employs a channel 166 which may be identical to the channel 24 discussed above and illustrated in FIG. 1, and the pipe 168 supported from the channel may be identical to pipe 22.

In addition to channel 166, pipe support system 164 includes a pipe clamp 170. The latter is composed of two straplike components 172 and 174 configured to clamp pipe 168 therebetween as shown in FIG. 12 and thereby support the pipe from channel 166.

An integral head 176 providing opposed, outwardly opening recesses 178 and 180 is formed at the channel-associated end of each clamp component 172 and 174. These notches or recesses 178 and 180 accommodate the flanges 182 and 184 of channel 166 in which the heads 176 of clamp components 172 and 174 are trapped (see especially FIG. 13) when clamp 170 is assembled to channel 166 to support pipe 168 from that support system component.

Pipe clamp 170 also includes a fastener 186. This fastener extends through component 172 of the clamp adjacent the outer or free end 187 of that component. Fastener 186 is also threaded through the cooperating clamp component 174 near its outer end 188. Consequently, rotating fastener 186 draws the free ends 187 and 188 of the cooperating clamp components 172 and 174 together to secure pipe 168 between those components and thereby attach it to channel 166.

There must necessarily be relatively large tolerances between channel 166 and the associated heads 176 of pipe clamp components 172 and 174 so that those components can be slid along channel 166 to the location designated for pipe 168. Thus, only small amounts of friction can be generated between the pipe clamp components and channel 166. Therefore, the illustrated system 164 may not be capable of retaining pipe 168 at the wanted location along channel 166, especially in applications where channel 166 is vertically oriented and there is a significant downward force on the pipe.

Aside from the drawback just discussed, the pipe-supporting system 164 shown in FIGS. 12 and 13 is desirable because it is simple and inexpensive to manufacture.

Figure 14:
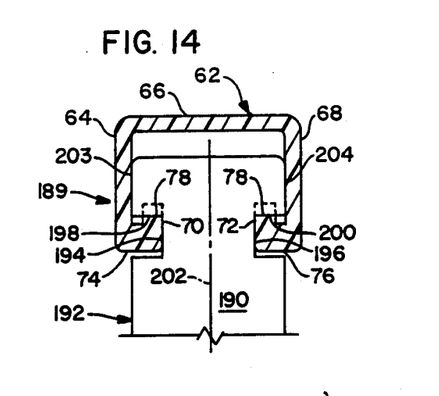
FIGS. 14 and 15 are sections through a pipe support system which resembles the system illustrated in FIG. 12 but embodies the principles of the present invention.
Figure 15:
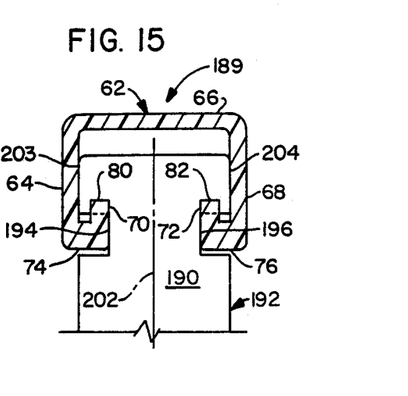

Turning next to FIGS. 14 and 15, the above-discussed inability of system 164 to prevent slippage of the supported load relative to its supporting strut or channel may be eliminated and the advantages of that system retained by substituting a channel 62 of the character discussed above and illustrated in FIG. 3 for the channel 166 employed in system 164 in accord with the principles of the present invention. As in the previously discussed embodiments of the invention, this produces a system with a positive support channel-to-fitting connection which eliminates the problem of a load slippage.

The resulting pipe-supporting system 189, depicted in FIGS. 14 and 15, employs the same notched support channel or strut 62 discussed above without modification and a clamp much like the one illustrated in FIG. 12 and identified by reference character 170. The upper, channel spanning ends 190 of the two, cooperating components of the system 189 pipe clamp (one of which is shown in FIGS. 14 and 15 and identified by reference character 192) have notches 194 and 196 which differ slightly in configuration from the notches 178 and 180 in the pipe clamp components of system 166. In particular, the inner edges 198 and 200 of notches 194 and 196 extend at a right angle rather than an acute angle to the longitudinal centerline 202 of the pipe clamp component.

With this minor modification and the pipe clamp of system 189 assembled to the associated channel 62, the opposite edge portions 203 and 204 of each pipe clamp component head 190 are seated on the inner ends 93 of the notches 78 in channel 62. A pipe such as that identified by reference character 168 in FIG. 12 and located between the pipe clamp components keeps the heads 190 of the pipe clamp components seated in recesses 78. Thus, as in the embodiments of the invention discussed above, there is an interfitting relationship between the channel and pipe clamp components in system 189 and a positive connection therebetween which keeps the pipe from shifting along channel 62 even in the worst case orientation of the channel and supported pipe discussed above.

Channels 62 which will accommodate pipe clamps as illustrated in FIGS. 4 and 5 and connectors as shown in FIGS. 10 and 11 will equally well accommodate clamps of the type shown in FIGS. 14 and 15. This further demonstrates the universality of the novel channel-type support shown in FIG. 3 in accepting, without modification, a variety of load attaching clamps and other connectors.

It is not of course essential in constructing systems employing the principles of the present invention that channels of type illustrated in FIG. 3 and identified by reference character 62 be employed to the exclusion of conventional channels such as those shown in FIGS. 1, 6, and 12. Instead, the use of channels 62 can be restricted to locations where slippage is apt to occur and the simpler, even less expensive to produce channels shown in FIGS. 1, 6, and 12 employed elsewhere. This even further reduces the cost of the system and increases its economic competitiveness.

the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A support system comprising: an elongated channel and a component for attaching a load to said channel, said channel being fabricated of a rigid, vibration abosorbing, non-metallic, engineered polymer and having: segments of different thicknesses; a pair of spaced apart, parallel side walls; a back wall spanning and oriented at a right angle to said side walls; and a flange which is spaced inwardly from each of said side walls, said load attaching component having an element thereof trapped in said channel, said element of said load attaching component extending far enough from one toward the other of the side walls of the channel to keep the load attaching component from shifting from side to side in the channel to any substantial extent, and said flanges and the trapped element of said load attaching component having interengageable means providing a positive connection between said channel and said component and thereby keeping said component and said load from slipping relative to said channel, those of the interengageable means associated with said channel being oppositely positioned, paired notches of like dimensions formed in and opening onto the free edges of said flanges at intervals therealong; there being a series of notches in each of said flanges; all of said notches being of the same dimensions and configuration; the spacing between successive notches in each series thereof being the same; and the trapped element of the load attaching component being configured to complement the notches in the flanges of the system's channel and thereby keep the load attaching component from shifting along said channel in the longitudinal direction irrespective of the pair of notches in which the aforesaid element of the load supporting component may be trapped.

2. A support system as defined in claim 1 wherein said load attaching component includes first and second members having main body portions which are adapted to cooperate to confine a supported element therebetween, said members both having integral elements trapped in said channel and extending from one toward the other of the channel side walls as aforesaid, the trapped elements of the two members being adapted to respectively fit in two spaced apart pairs of said oppositely positioned notches, and the trapped elements of the two members being configured as aforesaid to complement the notches in the flanges of said channel to thereby keep the first and second members of the load attaching component and a load attached to the channel by said component from moving longitudinally relative to the channel.

3. A support system as defined in claim 2 in which the first and second members of the load attaching component are cooperating, straplike members disposed in facing relationship with cooperating portions thereof shaped to embrace opposite sides of the supported load, said load attaching component also including fastener means for clamping said straplike members together with the load between and embraced by said members.

4. A support system as defined in claim 3 wherein said fastener means extends through one of said straplike members and is threaded into the other of said members and is thereby capable of drawing said members together with the load between said members as aforesaid.

5. A support system as defined in claim 3 wherein said fastener means is located at ends of the cooperating, straplike members which lie beyond the confines of said channel and comprises a series of parallel, transverse slots in that portion of one of said straplike members adjacent the aforesaid end thereof; said portion of said first member slidably extending through said second straplike member adjacent an end thereof as aforesaid; and said fastener means further comprising an element rotatably mounted at said end of the second straplike member and having threads engageable in said slots, wherebhy rotation of said element is effective to draw said portion of said first member through said second member and thereby clamp said members together in embracing relationship to the load.

6. A support system comprising: an elongated channel and a component for attaching a load to said channel; said channel being fabricated of a rigid, vibration damping, non-metallic material and having: segments of different thicknesses; a pair of spaced apart, parallel side walls; and a flange which is spaced inwardly from each of said side walls, said load attaching component having an element thereof trapped in said channel, said element of said load attaching component extending far enough from one toward the other of the side walls of the channel to keep the load attaching component from shifting from side to side in the channel to any substantial extent, and said flanges and the trapped element of said load attaching component having interengageable means providing a positive connection between said channel and said component and thereby keeping said component and said load from slipping relative to said channel, those of the interengageable means associated with said channel being oppositely positioned, paired notches of like dimensions formed in and opening onto the free edges of said flanges at intervals therealong; there being a series of notches in each of said flanges; all of said notches being of the same dimensions and configuration; the spacing between successive notches in each series thereof being the same; and the trapped element of the load attaching component being configured to complement the notches in the flanges of the system's channel and thereby keep the load attaching component from shifting along said channel in the longitudinal direction irrespective of the pair of notches in which the aforesaid element of the load supporting component may be trapped, the load attaching component including a member with a cruciform configuration providing two oppositely extending, integral lugs, it being said lugs that fit into the selected pair of oppositely positioned notches in the channel and engage the side walls of the channel as aforesaid to keep said load attaching component from shifting from side to side in the channel and from moving longitudinally relative to the channel, and the aforesaid member of the load supporting component further having an integral main body portion which fits between and spans the flanges of the channel.

7. A support system comprising: an elongated channel and a component for attaching a load to said channel, said channel being fabricated of a rigid, vibration damping, engineered polymer and having: segments of different thicknesses; a pair of parallel, spaced apart side walls; a back wall spanning, and oriented at right angles to, said side walls; and flanges spaced inwardly from said side walls with a gap between said flanges, said load attaching component having a first member with an element trapped in said channel, a second member to which the load is adapted to be attached, and means for securing said second member to said first member, said trapped element of said first member extending far enough from one to the other of the side walls of the channel to keep the load attaching component from shifting from side to side in the channel to any substantial extent; said flanges and the first member of said load attaching component having interengageable means providing a positive connection between said channel and said component and thereby keeping said component and said load from slipping relative to said channel; those of the interengageable means associated with said channel being oppositely positioned, paired notches of like dimensions formed in and opening onto the free edges of said flanges at intervals therealong; there being a series of notches in each of said flanges; all of said notches being of the same dimensions and configuration; the spacing between successive notches in each series thereof being the same; and the trapped element of said first member of the load attaching component being configured to fit into a selected pair of oppositely positioned notches in said channel and dimensioned in the longitudinal direction to complement the notches in the flanges of the system's channel and thereby keep the load attaching component from shifting along said channel.

8. A support system as defined in claim 7 wherein the second member of the load attaching component has a first portion to which the load can be attached and a second portion which is adapted to span the gap between the flanges of, and fit against, the channel of the system on the exterior side of the channel, the means for securing the second member of the load attaching component to the first member thereof comprising a fastener which extends through said first member and is threaded into said second member and is thereby adapted to clamp the first and second members to said channel with said first member seated in said selected oppositely positioned pair of notches in the flanges of the channel.

9. A support system comprising: an elongated channel and a component for attaching a load to said channel; said channel being fabricated of a rigid, vibration damping, non-metallic material and having: segments of different thicknesses; a pair of parallel, spaced apart side walls; and flanges spaced inwardly from said side walls with a gap between said flanges, said load attaching component having a first member with an element trapped in said channel, a second member to which the load is adapted to be attached, and means for securing said second member to said first member, said trapped element of said first member extending far enough from one to the other of the side walls of the channel to keep the load attaching component from shifting from side to side in the channel to any substantial extent; said flanges and the first member of said load attaching component having interengageable means providing a positive connection between said channel and said component and thereby keeping said component and said load from slipping relative to said channel; those of the interengageable means associated with said channel being oppositely positioned, paired notches of like dimensions formed in and opening onto the free edges of said flanges at intervals therealong; there being a series of notches in each of said flanges; all of said notches being of the same dimensions and configuration; the spacing between successive notches in each series thereof being the same; the trapped element of said first member of the load attaching component being configured to fit into a selected pair of the oppositely positioned notches in said channel and dimensioned in the longitudinal direction to complement the notches in the flanges of the system's channel and thereby keep the load attaching component from shifting along said channel; the first member of the load attaching component having a cruciform configuration providing two oppositely extending, integral lugs, it being said lugs that fit into the selected pair of oppositely positioned notches in the channel and extend toward one and the other of the side walls of the channel as aforesaid to keep said load attaching component from shifting from side to side in the channel and from moving longitudinally relative to the channel; and the first member of the load supporting component further having an integral main body portion which fits between and spans the flanges of the channel.

10. An elongated channel which is adaped to be used with a load attaching component having an element thereof trapable in said channel to support a load from the channel, said channel being fabricated of a rigid, vibration damping, engineered polymer and having: segments of different thicknesses; a pair of spaced apart, parallel side walls; a back wall spanning, and oriented at right angles to, said side walls; a flange which is spaced inwardly from each of said side walls; and means with which a trapped element of a load supporting element can be engaged to keep the load supporting component and a supported load from slipping relative to said channel, those means with which said trapped element are engageable being oppositely positioned, paired notches of like dimensions formed in and opening onto the free edges of said flanges at intervals therealong; there being a series of notches in each of said flanges; all of said notches being of the same dimensions and configuration; and the spacing between successive notches in each series thereof being the same, whereby the trapped element of a load attaching component configured to complement the notches in the flanges of the system's channel will be kept from shifting along said channel in the longitudinal direction irrespective of the pair of notches in which the aforesaid element of the load supporting component may be trapped.

* * * * *